US012765451B2

(12) United States Patent
Zhu et al.

(10) Patent No.: US 12,765,451 B2
(45) Date of Patent: Oct. 20, 2026

(54) TRANSVERSAL METHOD AND SYSTEM, ROBOT AND READABLE STORAGE MEDIUM

(71) Applicant: Suzhou Cleva Precision Machinery & Technology Co., Ltd., Suzhou City (CN)

(72) Inventors: Shaoming Zhu, Suzhou City (CN); Hong Chen, Suzhou City (CN)

(73) Assignee: Suzhou Cleva Precision Machinery & Technology Co., Ltd., Suzhou (CN)

( * ) Notice: Subject to any disclaimer, the term of this patent is extended or adjusted under 35 U.S.C. 154(b) by 589 days.

(21) Appl. No.: 17/768,602

(22) PCT Filed: Sep. 17, 2020

(86) PCT No.: PCT/CN2020/115888

§ 371 (c)(1),
(2) Date: Apr. 13, 2022

(87) PCT Pub. No.: WO2021/208352

PCT Pub. Date: Oct. 21, 2021

(65) Prior Publication Data

US 2024/0122100 A1 Apr. 18, 2024

(30) Foreign Application Priority Data

Apr. 17, 2020 (CN) ......................... 202010304657.2

(51) Int. Cl.

| | |
|---|---|
| ***A01D 34/00*** | (2006.01) |
| ***A01D 75/18*** | (2006.01) |
| *A01D 101/00* | (2006.01) |

(52) U.S. Cl.

CPC ......... *A01D 34/008* (2013.01); *A01D 75/185* (2013.01); *A01D 2101/00* (2013.01)

(58) Field of Classification Search

CPC ................ A01D 34/008; A01D 75/185; A01D 2101/00; G05D 1/0219; G05D 1/0214; G05D 1/0259

(Continued)

(56) References Cited

U.S. PATENT DOCUMENTS 8,306,659 B2 * 11/2012 Abramson ............. H04B 3/548 700/250
10,037,038 B2 * 7/2018 Sandin ................. G05D 1/0259

(Continued)

FOREIGN PATENT DOCUMENTS

CN 106020207 A 10/2016
CN 106239528 A 12/2016

(Continued)

OTHER PUBLICATIONS

International Search Report for Application No. PCT/CN2020/115888, dated Jan. 18, 2021.

*Primary Examiner* — Jelani A Smith
*Assistant Examiner* — Dana D Ivey
(74) *Attorney, Agent, or Firm* — JK Intellectual Property Law, PA

(57) ABSTRACT

The present disclosure provides a traversal method and system, a robot and a readable storage medium. The method comprises: driving a robot to travel in a working region according to a predetermined mode and work synchronously; and adjusting the robot to continue working according to a predetermined first rule every time a turn sign is encountered, and adjusting the robot to return to the predetermined mode after the first rule is completed; wherein the first rule is: starting from the position where the turn sign is encountered, rotating clockwise or counterclockwise; after first rotation is carried out according to a first angle, continuing running for a first time according to the predetermined mode; and then, after second rotation is carried out (Continued)

according to a second angle in the same rotation direction as the previous rotation, continuing running for a second time according to the predetermined mode, the first angle being different from the second angle. The present disclosure is beneficial to improving the traversal ability and traversal efficiency of the robot.

6 Claims, 2 Drawing Sheets

(58) Field of Classification Search
USPC .............................................................. 701/50
See application file for complete search history.

(56) References Cited

U.S. PATENT DOCUMENTS

| | | | | |
|---|---|---|---|---|
| 2019/0113931 | A1* | 4/2019 | Zha | A47L 11/4061 |
| 2020/0238531 | A1* | 7/2020 | Lee | B25J 9/1697 |

FOREIGN PATENT DOCUMENTS

| | | | |
|---|---|---|---|
| CN | 109298718 | A | 2/2019 |
| CN | 110362079 | A | 10/2019 |
| CN | 110579213 | A | 12/2019 |
| CN | 110786783 | A | 2/2020 |
| JP | 2005230044 | A | 9/2005 |
| JP | 2018121538 | A | 8/2018 |

* cited by examiner

TRANSVERSAL METHOD AND SYSTEM, ROBOT AND READABLE STORAGE MEDIUM

CROSS-REFERENCE TO RELATED PATENT APPLICATIONS

This application is a national stage of International Application No. PCT/CN2020/115888, filed on Sep. 17, 2020, which claims priority to CN patent application No. 202010304657.2, filed on Apr. 17, 2020. All of the aforementioned applications are hereby incorporated by reference in their entireties.

TECHNICAL FIELD

The present disclosure relates generally to the field of intelligent control, and, in particular, to a traversal method and system, a robot, and a readable storage medium.

BACKGROUND

Low repetition rate and high coverage rate are the goals pursued by mobile robots such as traversing robots for dust absorption, mowing and swimming pool cleaning.

Taking an intelligent robot mower as an example, the robot mower works in a lawn enclosed by an electronic boundary as a working region. In practical applications, there are still obstacles such as artificial hills, flowers, fountains, etc. around the working region and in the lawn. The methods of random traversal of the robot mower and the lawn are complex and diverse, especially for the lawn with narrow passages or obstacles, the robot mower seldom randomly enters the narrow passages and the lawn near the obstacles, that is, the traversal ability is poor. As a result, the grass in some places of the lawn has not been mowed for a long time, especially when a certain region is large and square, the probability of missed mowing in the middle of the lawn is very high, and manual assisted removal is required.

In order to solve this problem, a variety of methods have been used without changing the random mode without changing the random mode: for example: by artificially setting different distances and increasing the number of wire windings as a starting point, this traversal method requires additional costs; and the robot is allowed to travel along the electronic boundary for different distances after leaving a charging station to enter the lawn, which will cause empty travel, and the long-term repeated travel will leave ruts to damage the lawn. Accordingly, the traversal methods in the prior art have the shortcomings of too high uniform distribution and random travel repetition rate and low mowing efficiency.

SUMMARY

In order to solve the above technical problems, the objectives of the present disclosure are to provide a traversal method and system, a robot, and a readable storage medium.

In order to achieve one of the above objectives of the present disclosure, an embodiment of the present disclosure provides a traversal method, the method including: driving a robot to travel in a working region according to a predetermined mode and work synchronously; and adjusting the robot to continue working according to a predetermined first rule every time a turn sign is encountered, and adjusting the robot to return to the predetermined mode after the first rule is completed;

The first rule is: starting from the position where the turn sign is encountered, rotating clockwise or counterclockwise; after first rotation is carried out according to a first angle, continuing running for a first time according to the predetermined mode; and then, after second rotation is carried out according to a second angle in the same rotation direction as the previous rotation, continuing running for a second time according to the predetermined mode, the first angle being different from the second angle.

As a further improvement of an embodiment of the present disclosure, one of the first angle and the second angle is a large angle, the other one is a small angle, the large angle is an obtuse angle, and the small angle is an acute angle.

As a further improvement of an embodiment of the present disclosure, the value range of the large angle is between 120° and 170°, and the value range of the small angle is between 20° and 80°.

As a further improvement of an embodiment of the present disclosure, the robot is adjusted to continue working by cyclically calling the first rule and a second rule every time a turn sign is encountered, and the robot is adjusted to return to the predetermined mode after the called first rule or second rule is completed. according to either the first angle or the second angle, continuing running for a first time according to the predetermined mode; and then, after second rotation is carried out according to the other of the first angle or the second angle in the same rotation direction as the previous rotation, continuing running for a second time according to the predetermined mode, the first angle being different from the second angle, the rotation direction of one of the first rule and the second rule being one of clockwise rotation and counterclockwise rotation, and the rotation direction of the other rule being the other of the clockwise rotation and counterclockwise rotation.

As a further improvement of an embodiment of the present disclosure, the method further includes:

randomly obtaining at least one time length from a preset time set every time a turn sign is encountered, and assigning the obtained time length to the first time and/or the second time, wherein the time set includes a plurality of known time lengths.

As a further improvement of an embodiment of the present disclosure, the method further includes:

every time a turn sign is encountered, randomly obtaining an angle value from a preset first rotation angle set as the first angle, and randomly obtaining an angle value from a preset second rotation angle set as the second angle, wherein both the first rotation angle set and the second rotation angle set store a plurality of angle values, and the angle values stored in the first rotation angle set are different from the angle values stored in the second rotation angle set.

In order to achieve one of the above objectives of the present disclosure, an embodiment of the present disclosure provides a robot, including a memory and a processor, the memory storing a computer program, and when the processor execute the computer program, the steps of the traversal method as described above are implemented.

In order to achieve one of the above objectives of the present disclosure, an embodiment of the present disclosure provides a readable storage medium, storing a computer program thereon, when the computer program is executed by a processor, the steps of the traversal method as described above are implemented.

In order to achieve another objective of the present disclosure, an embodiment of the present disclosure provides a traversal system, the system including:

a driving module, configured to drive a robot to travel in a working region according to a predetermined mode and work synchronously; and a rule adjusting module, configured to adjust the robot to continue working according to a predetermined first rule every time a turn sign is encountered, and adjust the robot to return to the predetermined mode after the first rule is completed;

The first rule is: starting from the position where the turn sign is encountered, rotating clockwise or counterclockwise; after first rotation is carried out according to a first angle, continuing running for a first time according to the predetermined mode; and then, after second rotation is carried out according to a second angle in the same rotation direction as the previous rotation, continuing running for a second time according to the predetermined mode, the first angle being different from the second angle.

As a further improvement of an embodiment of the present disclosure, the rule adjusting module is further configured to adjust the robot to continue working by cyclically calling the first rule and a second rule every time a turn sign is encountered, and adjust the robot to return to the predetermined mode after the called first rule or second rule is completed.

The second rule is: starting from the position where the turn sign is encountered, rotating clockwise or counterclockwise; after first rotation is carried out according to either the first angle or the second angle, continuing running for a first time according to the predetermined mode; and then, after second rotation is carried out according to the other of the first angle or the second angle in the same rotation direction as the previous rotation, continuing running for a second time according to the predetermined mode, the first angle being different from the second angle, the rotation direction of one of the first rule and the second rule being one of clockwise rotation and counterclockwise rotation, and the rotation direction of the other rule being the other of the clockwise rotation and counterclockwise rotation.

Compared with the prior art, the traversal method and system, robot and readable storage medium of the present disclosure have the advantages that after the robot encounters a turn sign, the robot is driven to rotate according to randomly set different angles and then continues to work, which improves the probability that the robot enters a special region without affecting the working efficiency of the robot, thereby achieving the purpose of increasing the traversal ability and traversal efficiency by optimizing the behavior mode of the robot.

DETAILED DESCRIPTION

The present disclosure will be described in detail below with reference to various embodiments shown in the accompanying drawings. However, these embodiments do not limit the present disclosure. Structures, methods, or functional transformations made by those of ordinary skill in the art based on these embodiments are all included within the protection scope of the present disclosure.

The robot system of the present disclosure may be a robot mower system, a sweeping robot system, a snow sweeper system, a leaf suction machine system, a golf course picker system, etc. Each system can automatically travel in a working region and perform corresponding work. In specific examples of the present disclosure, the robot mower system is taken as an example for detailed description. Correspondingly, the working region may be a lawn.

Figure 1:
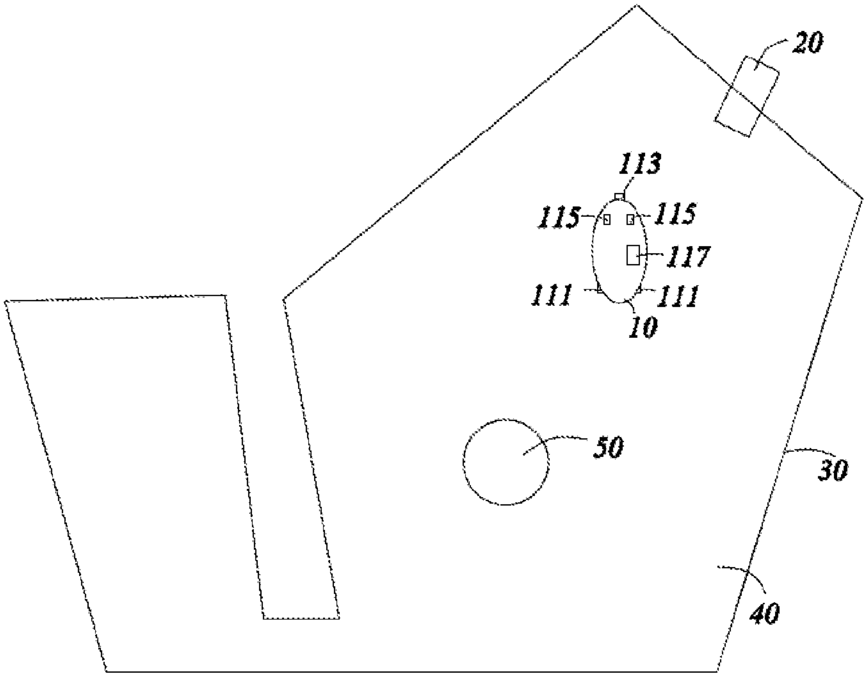
FIG. 1 is a schematic structural diagram of a robot mower system of the present disclosure.

As shown in FIG. 1, the robot mower system of the present disclosure includes a robot mower (RM), a charging station 20, and a boundary line 30.

The robot mower includes: a main body 10, and a walking unit and a control unit that are arranged on the main body 10. The walking unit includes: driving wheels 111, a driven wheel(s) 113 and a motor for driving the driving wheels 111; the motor may be a brushless motor with a reduction box and a Hall sensor; after the motor is started, the driving wheels 111 can be driven to travel by the reduction box, and can run straight forward and backward, turn on site, run in an arc manner, etc. by controlling the speed and direction of the two wheels; and the driven wheel(s) 113 may be a universal wheel(s), the number of which is usually 1 or 2, for supporting balance.

The control unit includes at least: a state sensor 115 and a data memory 117. The state sensor is configured to acquire a variety of information obtained by the walking robot during the process of walking along a patrol path, for example: acquire signal strength of an electromagnetic boundary on the patrol path. The control unit is also configured to judge the specific position of the walking robot through received signals, for example: judge whether the robot encounters a corner. The data memory is configured to store the variety of information obtained by the walking robot during the process of walking along the patrol path. The data memory is, for example, an EPROM, a Flash or an SD card.

Further, the robot mower also includes: a working mechanism for working, and a power supply. In this embodiment, the working mechanism includes a mowing cutter head, and various sensors for sensing the walking state of the walking robot, such as dumping, ground clearance, collision and geomagnetic sensors and a gyroscope, which will not be described in detail here.

The charging station 20 is usually arranged on the boundary line, and is configured to provide power for automatically charging the robot mower, generate coded pulse signals and transmit the same along the boundary line 30 connected to the charging station, thereby generating an alternating magnetic field on both sides of the boundary line. The boundary line 30 surrounds a lawn 40 to form a working region. After the boundary line 30 encircles the lawn, a whole working region can be formed. In addition, obstacles 50 that need to prevent the robot mower from entering, such as a pool and flowers, are also arranged in the working region.

Figure 2:
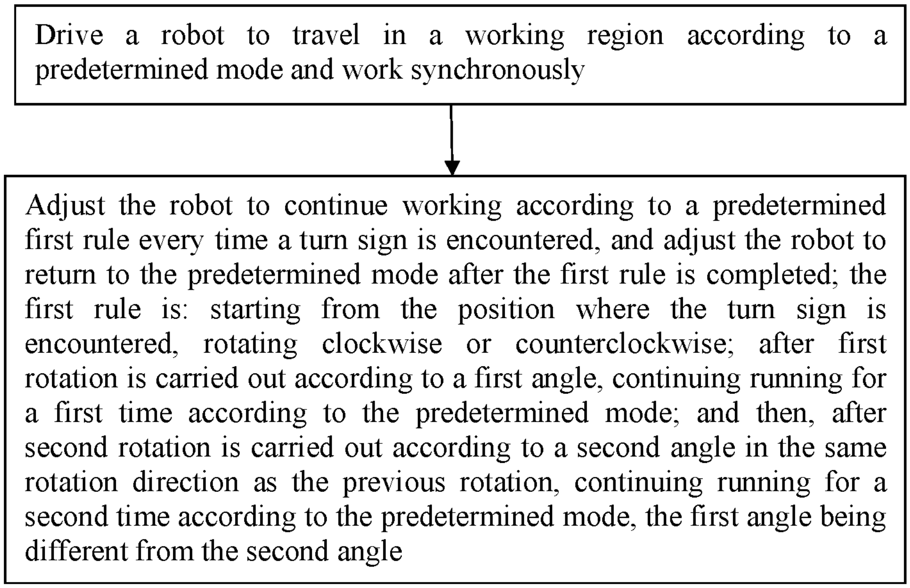
FIG. 2 is a schematic flowchart of a traversal method provided by an embodiment of the present disclosure.

As shown in FIG. 2, a traversal method provided by an embodiment of the present disclosure includes the following steps: driving a robot to travel in a working region according to a predetermined mode and work synchronously; adjusting the robot to continue working according to a predetermined first rule every time a turn sign is encountered, and adjusting the robot to return to the predetermined mode after the first rule is completed. The first rule is: starting from the position where the turn sign is encountered, rotating clockwise or counterclockwise; after first rotation is carried out according to a first angle, continuing running for a first time according to the predetermined mode; and then, after second rotation is carried out according to a second angle in the same rotation direction as the previous rotation, continuing running for a second time according to the predetermined mode, the first angle being different from the second angle.

The turn sign includes inner and outer boundaries of the working region, and obstacles in the working region. In an embodiment of the present disclosure, before the robot is driven to work, an electronic map covering the working region is established, and the turn sign is marked in the electronic map. In another embodiment of the present disclosure, during the walking process of the robot, the surrounding environment is explored in real time by sensors thereon, whether there is an obstacle on the travel path is judged in real time by means of touch perception, electromagnetic signal strength, etc., and if so, the position of the obstacle is marked with a turn sign. Of course, in other embodiments of the present disclosure, there are also multiple ways to determine turn signs, which will not be further described here.

Figure 3:
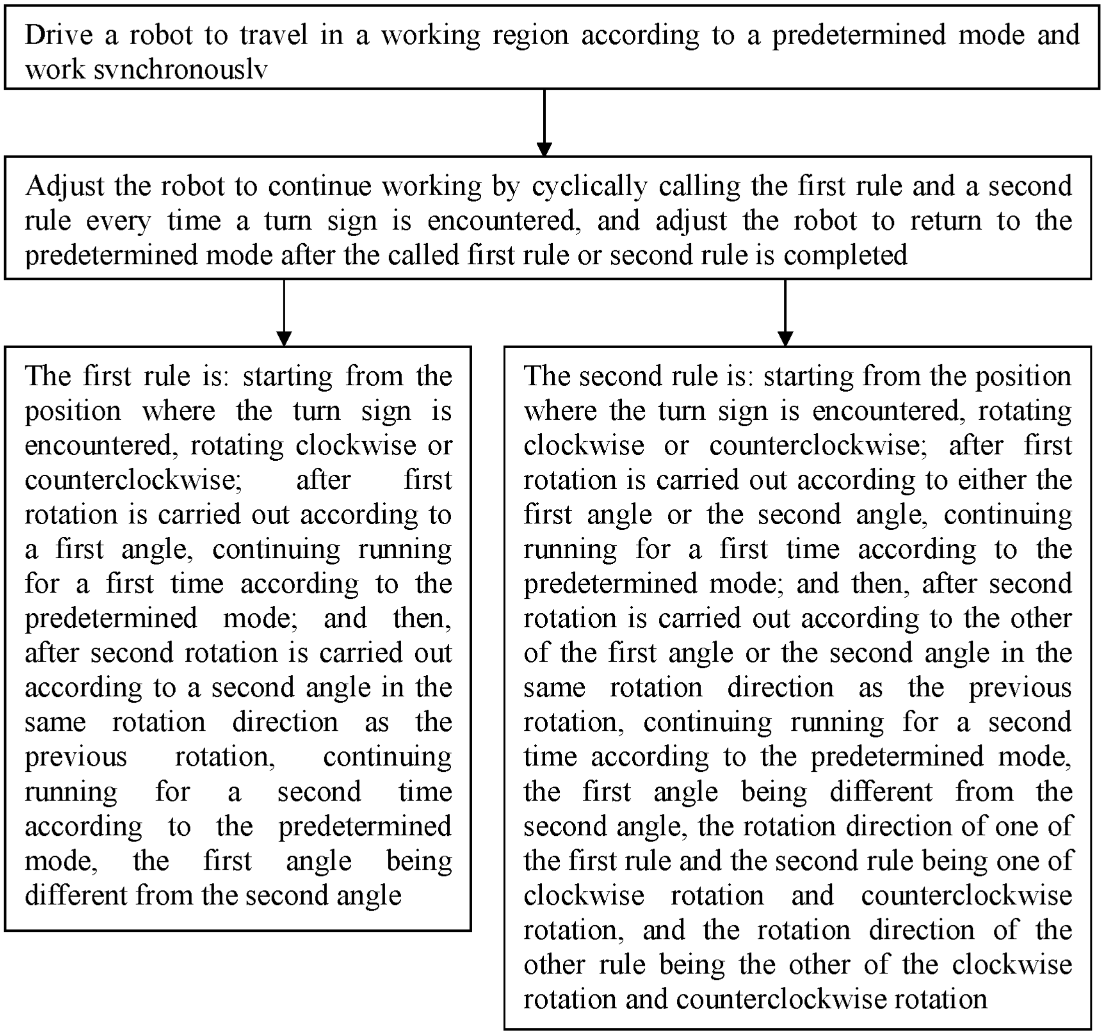
FIG. 3 is a schematic flowchart of a traversal method provided by a preferred embodiment of the present disclosure.

In a preferred embodiment of the present disclosure, with reference to FIG. 3, the method further includes: adjusting the robot to continue working by cyclically calling the first rule and a second rule every time a turn sign is encountered, and adjusting the robot to return to the predetermined mode after the called first rule or second rule is completed.

The second rule is: starting from the position where the turn sign is encountered, rotating clockwise or counterclockwise; after first rotation is carried out according to either the first angle or the second angle, continuing running for a first time according to the predetermined mode; and then, after second rotation is carried out according to the other of the first angle or the second angle in the same rotation direction as the previous rotation, continuing running for a second time according to the predetermined mode, the first angle being different from the second angle, the rotation direction of one of the first rule and the second rule being one of clockwise rotation and counterclockwise rotation, and the rotation direction of the other rule being the other of the clockwise rotation and counterclockwise rotation.

It should be noted that, in order to facilitate the rotation of the robot, under normal circumstances, when the robot encounters a turn sign, the robot is first driven to move backward for a small distance, and then turns according to the predetermined rule.

Preferably, one of the first angle and the second angle is a large angle, the other one is a small angle, the large angle is an obtuse angle, and the small angle is an acute angle.

In a specific embodiment of the present disclosure, the value range of the large angle is between 120° and 170°, and the value range of the small angle is between 20° and 80°.

Further, the method further includes: every time a turn sign is encountered, randomly obtaining an angle value from a preset first rotation angle set as the first angle, and randomly obtaining an angle value from a preset second rotation angle set as the second angle, where both the first rotation angle set and the second rotation angle set store a plurality of angle values, and the angle values stored in the first rotation angle set are different from the angle values stored in the second rotation angle set.

In this embodiment, for example, it is preset in the system that the first rotation angle set includes specific angle values of either a plurality of small angle values or large angle values, and the second rotation angle set includes specific angle values of the other of the plurality of small angle values and large angle values. When a turn sign is encountered, a small angle value and a large angle value are randomly obtained from the first rotation angle set and the second rotation angle set respectively at the current time, and the obtained small angle value and large angle value are randomly assigned to the first angle and the second angle.

Of course, in other embodiments of the present disclosure, a fixed small angle value and a fixed large angle value may also be set. Every time a turn sign is encountered, the fixed small angle value is assigned to one of the first angle and the second angle, and the fixed large angle is assigned to the other of the first angle and the second angle, which will not be further described here.

In a preferred embodiment of the present disclosure, the method further includes randomly obtaining at least one time length from a preset time set every time a turn sign is encountered, and assigning the obtained time length to the first time and/or the second time, wherein the time set includes a plurality of known time lengths.

In this embodiment, the time set preset in the system includes a plurality of time lengths, for example: the time set includes: 5 minutes, 10 minutes, 15 minutes, 20 minutes, and 25 minutes. When a turn sign is encountered, the time length randomly obtained at the current time is 5 minutes. Correspondingly, the 5 minutes may be assigned to the first time and the second time synchronously, or the 5 minutes may be assigned to either the first time or the second time, then the time set is queried again, and a time length is obtained again and assigned to the other of the first time and the second time.

Of course, in other embodiments of the present disclosure, a fixed time length may also be set, and every time a turn sign is encountered, the fixed time length is assigned to the first time and/or the second time, which will not be further described here.

In a specific example of the present disclosure, the robot is adjusted to continue working by cyclically calling the first rule and the second rule every time a turn sign is encountered, and the robot is adjusted to return to the predetermined mode after the called first rule or second rule is completed. For example: the first rule is called when a turn sign is encountered for the first time, the second rule is called when a turn sign is encountered for the second time, the first rule is repeatedly called when a turn sign is encountered for the third time, and so on. In this specific example, the randomly obtained rotation angles are sequentially (120°, 60°), (−120°, −60°), (150°, 70°), (−150°, −70°), (50°, 140°), (−50°, −140°), and the first time and the second time are both 5 minutes. In this specific example, the positive angles indicates counterclockwise rotation, the negative angles indicates clockwise rotation, the angle values in odd numbers and in the same bracket correspond to the first rule, and the angle values in even numbers and in the same bracket correspond to the second rule; after each first rotation, the robot continues working for 5 minutes according to the current path and then carries out second rotation; and after each second rotation, the robot continues working for 5 minutes according to the current path, the current rule called is completed, and the robot rotates to the predetermined mode and continues working. It should be noted that, in practical applications, the direction and angle of rotation and the duration of the rule can be set as needed; moreover, in the process of calling the rule, if a corner is encountered again, or the robot returns to charging, or the robot fails, etc., it indicates that the current rule is completed.

The traversal of the working region in the above manner can ensure that the lawn in the boundary region, the middle part of the working region, and special working regions (such as a plurality of working regions connected by narrow passages) will be effectively traversed, which solves the problems of missed mowing caused by random travel for mowing and low mowing efficiency caused by repeated mowing.

In an embodiment of the present disclosure, a robot is further provided, including a memory and a processor, the memory storing a computer program, and when the processor executes the computer program, the steps of the traversal method described above are implemented.

In an embodiment of the present disclosure, a readable storage medium is further provided, storing a computer program thereon, and when the computer program is executed by a processor, the steps of the traversal method described above are implemented.

Figure 4:
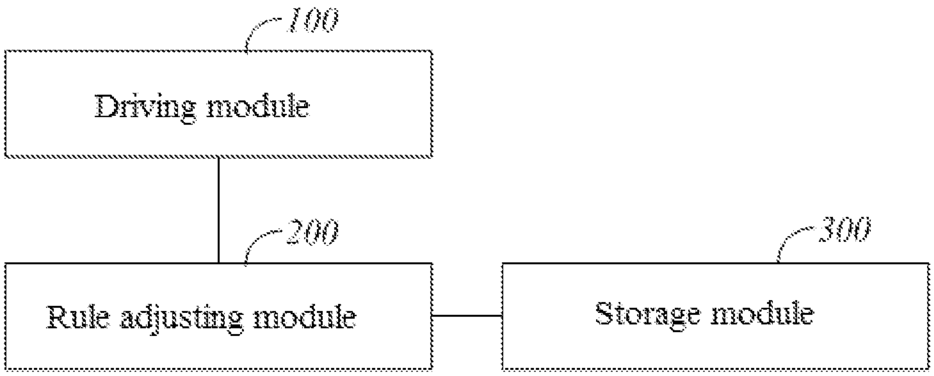
FIG. 4 is a schematic diagram of modules of a traversal system provided by an embodiment of the present disclosure.

With reference to FIG. 4, a traversal system is provided, the system including: a driving module 100 and a rule adjusting module 200.

The driving module 100 is configured to drive a robot to travel in a working region according to a predetermined mode and work synchronously. The rule adjusting module 200 is configured to adjust the robot to continue working according to a predetermined first rule every time a turn sign is encountered, and adjust the robot to return to the predetermined mode after the first rule is completed. The first rule is: starting from the position where the turn sign is encountered, rotating clockwise or counterclockwise; after first rotation is carried out according to a first angle, continuing running for a first time according to the predetermined mode; and then, after second rotation is carried out according to a second angle in the same rotation direction as the previous rotation, continuing running for a second time according to the predetermined mode, the first angle being different from the second angle.

In a preferred embodiment of the present disclosure, the rule adjusting module 200 is specifically configured to adjust the robot to continue working by cyclically calling the first rule and a second rule every time a turn sign is encountered, and adjust the robot to return to the predetermined mode after the called first rule or second rule is completed.

The second rule is: starting from the position where the turn sign is encountered, rotating clockwise or counterclockwise; after first rotation is carried out according to either the first angle or the second angle, continuing running for a first time according to the predetermined mode; and then, after second rotation is carried out according to the other of the first angle or the second angle in the same rotation direction as the previous rotation, continuing running for a second time according to the predetermined mode, the first angle being different from the second angle, the rotation direction of one of the first rule and the second rule being one of clockwise rotation and counterclockwise rotation, and the rotation direction of the other rule being the other of the clockwise rotation and counterclockwise rotation.

It should be noted that, in order to facilitate the rotation of the robot, under normal circumstances, when the robot encounters a turn sign, the robot is first driven to move backward for a small distance, and then turns according to the predetermined rule.

Preferably, one of the first angle and the second angle is a large angle, the other one is a small angle, the large angle is an obtuse angle, and the small angle is an acute angle.

In a specific embodiment of the present disclosure, the value range of the large angle is between 120° and 170°, and the value range of the small angle is between 20° and 80°.

Further, in a preferred embodiment of the present disclosure, the system further includes a storage module 300 for storing a preset first rotation angle set and a preset second rotation angle set, both the first rotation angle set and the second rotation angle set store a plurality of angle values, and the angle values stored in the first rotation angle set are different from the angle values stored in the second rotation angle set; and the rule adjusting module 200 is further configured to, every time a turn sign is encountered, randomly obtain an angle value from the preset first rotation angle set as the first angle, and randomly obtain an angle value from the preset second rotation angle set as the second angle.

In a preferred embodiment of the present disclosure, the storage module 300 is further configured to store a preset time set, the time set including plurality of known time lengths; and the rule adjusting module 200 is further configured to randomly obtain at least one time length from the preset time set every time a turn sign is encountered, and assign the obtained time length to the first time and/or the second time.

Those skilled in the art can clearly understand that, for the convenience and brevity of the description, the specific working processes of the systems and modules described above may be referred to the corresponding processes in the foregoing method embodiments, which will not be repeated here.

To sum up, the traversal method and system, robot and readable storage medium of the present disclosure have the advantages that after the robot encounters a turn sign, the robot is driven to rotate according to randomly set different angles and then continues to work, which improves the probability that the robot enters a special region without affecting the working efficiency of the robot, thereby achieving the purpose of increasing the traversal ability and traversal efficiency by optimizing the behavior mode of the robot.

In the several embodiments provided in this application, it should be understood that the disclosed modules, systems and methods can all be implemented in other ways. The system embodiment described above is only illustrative. The division of the modules is only a logic function division, and other divisions may be used in practice. For example, a plurality of modules or components may be combined or integrated to another system, or some features may be neglected or not executed.

The modules described as separate components may be or may not be physically separated, and the components displayed as modules may be or may not be physical modules, that is, the components may be located at one place or may also be distributed on a plurality of network modules. Some or all of the modules may be selected according to actual requirements to achieve the objective of the solution in this embodiment.

In addition, each functional module in each embodiment of the present application may be integrated into one processing module, or each module may exist physically alone, or two or more modules may be integrated into one module. The integrated modules may be implemented in the form of hardware, or may be implemented in the form of hardware plus software function modules.

Finally, it should be noted that the above embodiments are only used to illustrate the technical solutions of the present application, but not to limit them; although the present application is described in detail with reference to the foregoing embodiments, those of ordinary skill in the art should understand that modifications can still be made to the technical solutions described in the foregoing embodiments, or equivalent substitutions can be made to some of the technical features; and these modifications or substitutions do not make the essence of the corresponding technical solutions deviate from the spirit and scope of the technical solutions of the embodiments of the present application.

The invention claimed is:

1. A traversal method, comprising:

driving a robot to travel in a working region according to a predetermined mode and to perform work while traveling in the working region; and adjusting the robot to continue working by cyclically following a predetermined first rule or a predetermined second rule every time a turn sign is encountered, and adjusting the robot to return to the predetermined mode after the first rule or the second rule is completed;

wherein the first rule is: starting from the position where the turn sign is encountered, rotating in one of a clockwise or a counterclockwise direction according to a first angle;

after rotating according to the first angle, continuing running for a first time according to the predetermined mode;

rotating in the one of the clockwise or the counterclockwise direction according to a second angle, the first angle being different from the second angle;

after rotating according to the second angle, continuing running for a second time according to the predetermined mode;

wherein the second rule is: starting from the position where the turn sign is encountered, rotating in the other of the clockwise or the counterclockwise direction according to a first angle;

after rotating according to the first angle, continuing running for a first time according to the predetermined mode;

rotating in the other of the clockwise or the counterclockwise direction according to a second angle, the first angle being different from the second angle;

after rotating according to the second angle, continuing running for a second time according to the predetermined mode;

wherein the method further includes, every time a turn sign is encountered, randomly obtaining an angle value from a preset first rotation angle set as the first angle, and randomly obtaining an angle value from a preset second rotation angle set as the second angle, wherein both the first rotation angle set and the second rotation angle set store a plurality of angle values, and the angle values stored in the first rotation angle set are different from the angle values stored in the second rotation angle set;

wherein the method further includes, every time a turn sign is encountered, randomly obtaining a time length from a present time set as the first time and the second time, the time set comprising a plurality of known time lengths.

2. The traversal method according to claim 1, wherein one of the first angle and the second angle is a large angle, the other of the first angle and the second angle is a small angle, the large angle is an obtuse angle, and the small angle is an acute angle.

3. The traversal method according to claim 2, wherein the value range of the large angle is between 120° and 170°, and the value range of the small angle is between 20° and 80°.

4. A robot, comprising a memory and a processor, the memory storing a computer program, wherein when the processor executes the computer program, the steps of the traversal method according to claim 1 are implemented.

5. A non-transitory readable storage medium, storing a computer program thereon, wherein when the computer program is executed by a processor, the steps of the traversal method according to claim 1 are implemented.

6. A traversal system comprising a self-moving robot performing the steps of the traversal method according to claim 1.

* * * * *